May 22, 1956     I. R. LOSS     2,746,418
POSITION INDICATOR FOR SHAFTS
Filed April 16, 1954

INVENTOR
ISIDOR R. LOSS
BY
HIS ATTORNEY

2,746,418
POSITION INDICATOR FOR SHAFTS

Isidor R. Loss, Phillipsburg, N. J., assignor to Ingersoll-Rand Company, New York, N. Y., a corporation of New Jersey Application April 16, 1954, Serial No. 423,706

1 Claim. (Cl. 116—124)

This invention relates to indicating devices, and more particularly to a position indicator for shafts.

The invention is particularly applicable to machines in which it is essential that its rotative parts be held against axial movement. Examples of such machines are centrifugal pumps and blowers wherein the clearances between the rotative and stationary parts must be held to narrow limits since otherwise the efficiency of the pump may drop seriously and if the parts become worn to the extent of permitting axial movement of the rotor damage may result thereto and to the casing.

It is accordingly an object of the present invention to indicate any departure axially of a shaft from its correct assembled position in a machine of which it forms a part.

A more specific object is to at all times assure the maintenance of the original efficiency of a machine of which the shaft forms a part and to avoid damage to the rotative and contiguous stationary parts of the machine.

Other objects will be in part obvious and in part pointed out hereinafter.

Figure 1:
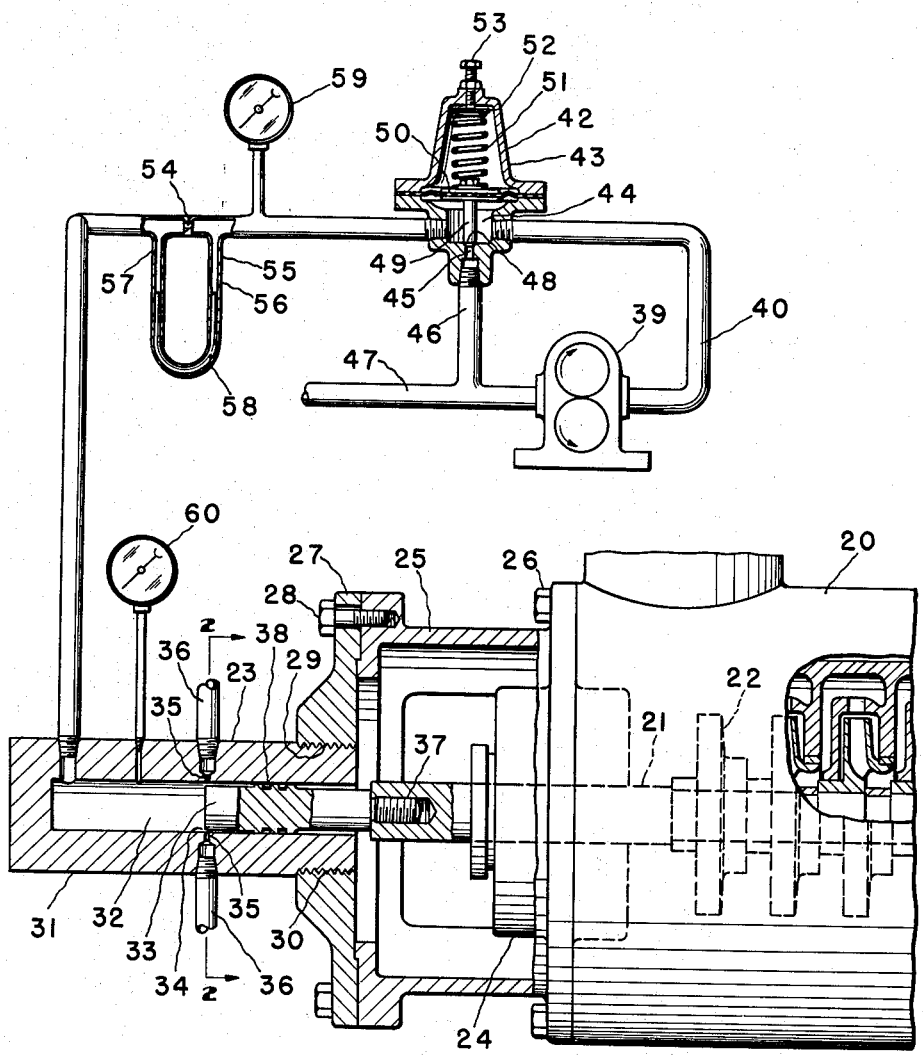
Figure 2:
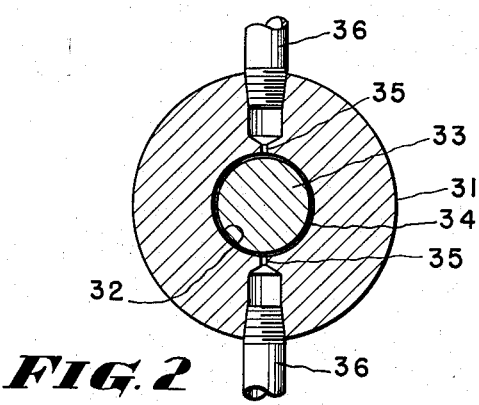

In the drawings accompanying this specification and in which similar reference numerals refer to similar parts, Figure 1 is a side elevation, partly broken away, of an end portion of a centrifugal pump having the invention applied thereto, and Fig. 2 is a transverse view taken through Figure 1 on the line 2—2.

Referring more particularly to the drawings, 20 designates a casing of a centrifugal pump, 21 its shaft having a group of impellers 22 thereon, and 23 designates, in general, apparatus for indicating the position of the shaft 21 relatively to the casing 20 and any deviation, axially, from its correct assembled position with respect to the casing.

It is to be understood that the pump is provided with the usual means, such as a thrust bearing, for obviating axial movement of the shaft and thus to assure the retention of the impellers 22 in substantially the correct relationship with the walls of the chambers wherein they operate.

The casing 20 is shown provided with a housing 24 for a bearing (not shown) for the shaft 21 which, in accordance with the practice of the invention, projects outwardly from the housing 24 and into a casing 25 secured to the pump casing 20 by bolts 26. The casing 25 is hollow throughout and at its outer end is a plate 27 which is secured to the casing 25 by bolts 28 and has a central threaded aperture 29 to receive the threads 30 of a body 31.

The body 31 is recessed to provide an elongated cylindrical chamber 32 that is located coaxially with the shaft 21 for the accommodation of an extension 33 carried by the shaft 21. The extension 33 is of cylindrical shape and is of slightly smaller diameter than the wall of the chamber 32 to provide therebetween a clearance 34 for the passage of fluid from the chamber to an orifice or group of orifices 35 which serve as outlet openings for such fluid and, collectively, are of larger flow area than the clearance 34. Each orifice 35 opens into a drain conduit 36 threadedly connected to the body 31 for conveying such fluid from the vicinity of the pump.

The extension 33 may be secured to the shaft 21 in any suitable manner, as by a threaded connection 37, and carries in its periphery a plurality of sealing rings 38 for preventing leakage of fluid from the chamber 32 along the extension into the casing 25. The location of the orifices 35 and the length of the extension 33 are such that the free end area of the latter will overlie the orifices without, however, extending therebeyond when the shaft 21 occupies a position in which the impellers 22 bear the correct assembled relationship with respect to the adjacent casing parts of the pump.

The fluid controlled by the extension 33 is delivered to the chamber 32 by a gear pump 39 the discharge conduit 40 of which leads to the outer end portion of the chamber 32. The pressure of the fluid flowing through the conduit 40 is normally maintained constant by a pressure regulator 42 interposed in the discharge conduit 40.

In the form shown, the pressure regulator 42 comprises a casing 43 having a chamber 44 in its lower portion through which fluid flows from one branch to the other of the conduit 40, and in the bottom of the casing 43 is a port 45 that opens into a branch 46 of a supply conduit 47 for the pump 39. At the juncture of the port 45 and the chamber 44 is a seating surface 48 for a valve 49 which is carried by a diaphragm 50 that forms a closure for the upper end of the chamber 44 and is actuated by the pressure fluid therein for unseating the valve 49.

A compression spring 51 in the upper portion of the casing 43 seats at one end upon the diaphragm 50 and its other end against a plate 52 constantly tends to maintain the valve 49 seated upon the surface 48. The force of the spring 51 may be conveniently varied, to assure a desired pressure within the chamber 32, by a bolt 53 threaded into the upper end of the casing 43 and seating upon the plate 52.

The portion of the conduit leading from the pressure regulator 42 to the chamber 32 is also provided with means for indicating the rate of flow of fluid to the chamber 32. To this end it is provided with an orifice 54 and a manometer 55 depending from the conduit and having its legs 56 and 57 opening into the conduit 40 at points on the up-stream and down-stream sides, respectively, of the orifice 54 so that the body of mercury 58 of the manometer may be subjected to the pressures on the opposite sides of the orifice.

The pressures of the fluid on the opposite sides of the orifice 54 are indicated by a pressure gauge 59 located on the up-stream sides of the orifice and a pressure gauge 60 attached to the body 31 and subjected to the pressure within the chamber 32.

In practice, let it be assumed that the rotative parts of the pump, including the shaft 21 and the impellers 22, occupy their correct assembled positions and that the extreme free end portion of the extension 33 then overlies the orifices 35, also that the pump 39 is then supplying pressure fluid to the chamber 32 at a pressure maintained constant by the pressure regulator 42. During such operation of the devices, some of the pressure fluid will flow constantly from the chamber 32 through the clearance 34 to and through the orifices 35. Owing to the discharge of such pressure fluid from the chamber 32 the pressure within the chamber 32 will be somewhat lower than the pressure up-stream of the orifice 54, as may be readily ascertained by observing the positions of the indicators of the gauges 60 and 59.

This pressure differential will remain substantially constant as long as the position of the shaft 21 remains unchanged. In the event, however, that the stationary and rotary portions of the pump serving to prevent axial movement of the shaft become worn so that the shaft is capable of movement axially, say in the left hand direction as Figure 1 is viewed in the drawings, the length of the restricted space or clearance 34 from the free end of the extension to the orifices 35 will be increased. A lesser amount of fluid will then flow to the orifices 35 and, consequently, the pressure within the chamber 32, will rise. Such increase in pressure will be indicated by the pressure gauge 60 and the reduction in the rate of flow of fluid through the conduit 40 will be indicated by the manometer 55 thereby indicating clearly, by comparison with the gauge 59, that the shaft 21 has shifted leftward from its original position.

In the event that the surfaces relied upon to prevent shifting of the shaft and the impellers in a right hand direction become worn to the extent of permitting axial movement of the shaft, the extension 33 will establish a shorter flow area from the chamber 32 through the clearance 34 to the orifices 35 or partly uncover the orifices.

In such case, the flow of pressure fluid from the chamber 32 through the orifices 35 will increase and the pressure of the fluid within the chamber 32 will drop correspondingly. Such drop in pressure within the chamber 32 will be indicated by the gauge 60.

I claim:

The combination with a casing and a shaft in the casing, of a body adjacent an end of the shaft having a chamber and an escape opening for the chamber, a member in the chamber carried by the shaft for movement axially therewith and controlling the effective size of the escape opening by axial movement of the shaft, means for feeding a restricted supply of pressure fluid to the chamber, and means for indicating variations in the pressure of the fluid in the chamber occurring whenever the member moves axially of the chamber.

References Cited in the file of this patent

FOREIGN PATENTS 8,493     Great Britain _____ of 1895